(12) United States Patent
Kreuzer et al.

(10) Patent No.: US 7,741,581 B2
(45) Date of Patent: Jun. 22, 2010

(54) HEATABLE STEERING WHEEL

(75) Inventors: Martin Kreuzer, Kleinwallstadt (DE); Jan Isensee, Bad Vilbel (DE); Robert Binder, Rodenbach (DE); Christian Stricker, Dirken-Honigsessen (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 1150 days.

(21) Appl. No.: 11/241,664

(22) Filed: Sep. 30, 2005

(65) Prior Publication Data

US 2006/0066084 A1 Mar. 30, 2006

(30) Foreign Application Priority Data

Sep. 30, 2004 (DE) .................. 20 2004 015 234 U

(51) Int. Cl.
B62D 1/06 (2006.01)

(52) U.S. Cl. ................ 219/204; 74/552; 74/558

(58) Field of Classification Search ........... 74/552, 74/558, 558.5; 219/204, 212, 211, 217, 528, 219/529

See application file for complete search history.

(56) References Cited

U.S. PATENT DOCUMENTS

| | | | | |
|---|---|---|---|---|
| 4,547,655 A | * | 10/1985 | Kurata et al. | 219/204 |
| 6,065,366 A | * | 5/2000 | Koyama et al. | 74/552 |
| 6,326,593 B1 | * | 12/2001 | Bonn et al. | 219/204 |
| 6,360,632 B1 | * | 3/2002 | Papandreou | 74/558 |
| 6,392,195 B1 | * | 5/2002 | Zhao et al. | 219/204 |
| 6,509,552 B1 | | 1/2003 | Roske et al. | |
| 6,512,202 B2 | * | 1/2003 | Haag et al. | 219/204 |
| 6,524,515 B1 | | 2/2003 | Cavalli | |
| 6,649,886 B1 | * | 11/2003 | Kleshchik | 219/529 |
| 6,668,683 B2 | * | 12/2003 | Fleckenstein | 74/552 |
| 2002/0008097 A1 | | 1/2002 | Hobby | |
| 2004/0155020 A1 | * | 8/2004 | Worrell et al. | 219/204 |

FOREIGN PATENT DOCUMENTS

| | | |
|---|---|---|
| DE | 10004501 | 9/2001 |
| DE | 10138118 | 4/2003 |
| DE | 69909199 | 4/2004 |
| EP | 0985590 | 3/2000 |
| JP | 04163277 A * | 6/1992 |

* cited by examiner

*Primary Examiner*—Richard W Ridley
*Assistant Examiner*—Thomas Diaz
(74) *Attorney, Agent, or Firm*—Tarolli, Sundheim, Covell & Tummino LLP

(57) ABSTRACT

A heatable steering wheel includes a steering wheel blank, a heating mat wrapped around the steering wheel blank, a first, visible hard sheathing whose surface is refinished after having been installed, a second, visible softer sheathing, both of the sheathings abutting each other in an abutting area, and a coupling element in the abutting area. The coupling element, as seen from the outside, has a depression and that, starting from the first sheathing, extends under the abutting area all the way to an abutting edge of the second sheathing. The heating mat extends continuously under the first sheathing and under the coupling element all the way to under the second sheathing.

14 Claims, 3 Drawing Sheets

HEATABLE STEERING WHEEL

TECHNICAL FIELD

The invention relates to a heatable steering wheel.

BACKGROUND OF THE INVENTION

Within the scope of efforts to improve the comfort of vehicle users, among other things, heatable steering wheels are offered so that the main gripping area of the steering wheel, that is to say, the steering wheel rim, can be set to a temperature that is pleasant to the touch. Nowadays, for design reasons, the steering wheel rim often has two different visible sheathings, for example, wood and leather, which abut each other. Since the edges of the wood sheathing have to be refinished after having been installed, there is a risk that heating wires or heating mats situated near the surface could be damaged. Currently, a solution to this problem consists of using several heating mats. In the abutting area, the individual heating mats are spaced apart from each other and either have to be subsequently joined to each other or else they each require a separate power supply.

An objective of the invention is to find an inexpensive and technically more advantageous approach to construct the abutting area of two sheathings of a heatable steering wheel.

BRIEF SUMMARY OF THE INVENTION

The present invention provides a heatable steering wheel including a steering wheel blank, a heating mat wrapped around the steering wheel blank, a first, visible hard sheathing whose surface is refinished after having been installed, a second, visible softer sheathing, both of the sheathings abutting each other in an abutting area, and a coupling element in the abutting area that, as seen from the outside, has a depression and that, starting from the first sheathing, extends under the abutting area all the way to an abutting edge of the second sheathing, and the heating mat extending continuously under the first sheathing and under the coupling element all the way to under the second sheathing.

The coupling element with the depression allows a refinishing of the hard sheathing, for example, a wood appliqué. At the same time, the coupling element protects the heating mat that is laid close to the surface against damage. Hence, the heating mats in the abutting area of the sheathings no longer need to be spaced apart from each other.

The heating mat can be made in one piece, i.e. can be wrapped around the entire steering wheel rim. This offers the advantage that only one power supply is needed and individual heating mats do not have to be connected to each other.

In an embodiment, the heating mat lies against the bottom of the coupling element. Hence, on the one hand, the heating mat is protected while, on the other hand, the heating mat can rapidly heat up the sheathing of the steering wheel rim, thanks to its position near the surface.

The abutting sheathings can either make a direct transition into the coupling element or else can lie against it. This avoids visible, undesired differences in the gap width in the abutting area. The gap width can be precisely defined by the coupling element.

In another embodiment, under the second sheathing, there is an equalization layer that is adjacent to the coupling element. Consequently, the coupling element forms a stopping point for the equalization layer and allows easier processing of the equalization material.

In a special embodiment, the coupling element is formed by a separate annular part. This separate part is inexpensive to manufacture and makes it superfluous to change the other known steering wheel components.

In this embodiment, the annular part can be a clasp. This offers the advantage that the second, softer sheathing is fastened by the clasp.

In another preferred embodiment, the coupling element is formed in one piece with the first sheathing. This means that the number of individual components can be kept low.

Preferably, the first, visible sheathing is a wood appliqué. Especially in the case of a sheathing made of wood, refinishing of the joint edge is necessary and the protection afforded by the coupling element is particularly advantageous.

The second, visible sheathing can be made of leather. In one embodiment, the abutting edge of the leather is beveled and extends into the depression of the coupling element. Thanks to this measure, the abutting area of the sheathings is designed so as to be visually flawless.

In another embodiment, the steering wheel blank consists of a steering wheel skeleton and a foam covering, wherein the foam covering has an indentation that serves to receive the coupling element. Thanks to this feature, the coupling element with the depression is no longer visible on the steering wheel surface once the sheathings have been mounted.

The indentation can have opposing side walls against which the coupling element lies. This offers the advantage that the coupling element is positioned in the circumferential direction of the steering wheel rim.

DETAILED DESCRIPTION OF THE PREFERRED EMBODIMENTS

Figure 1:
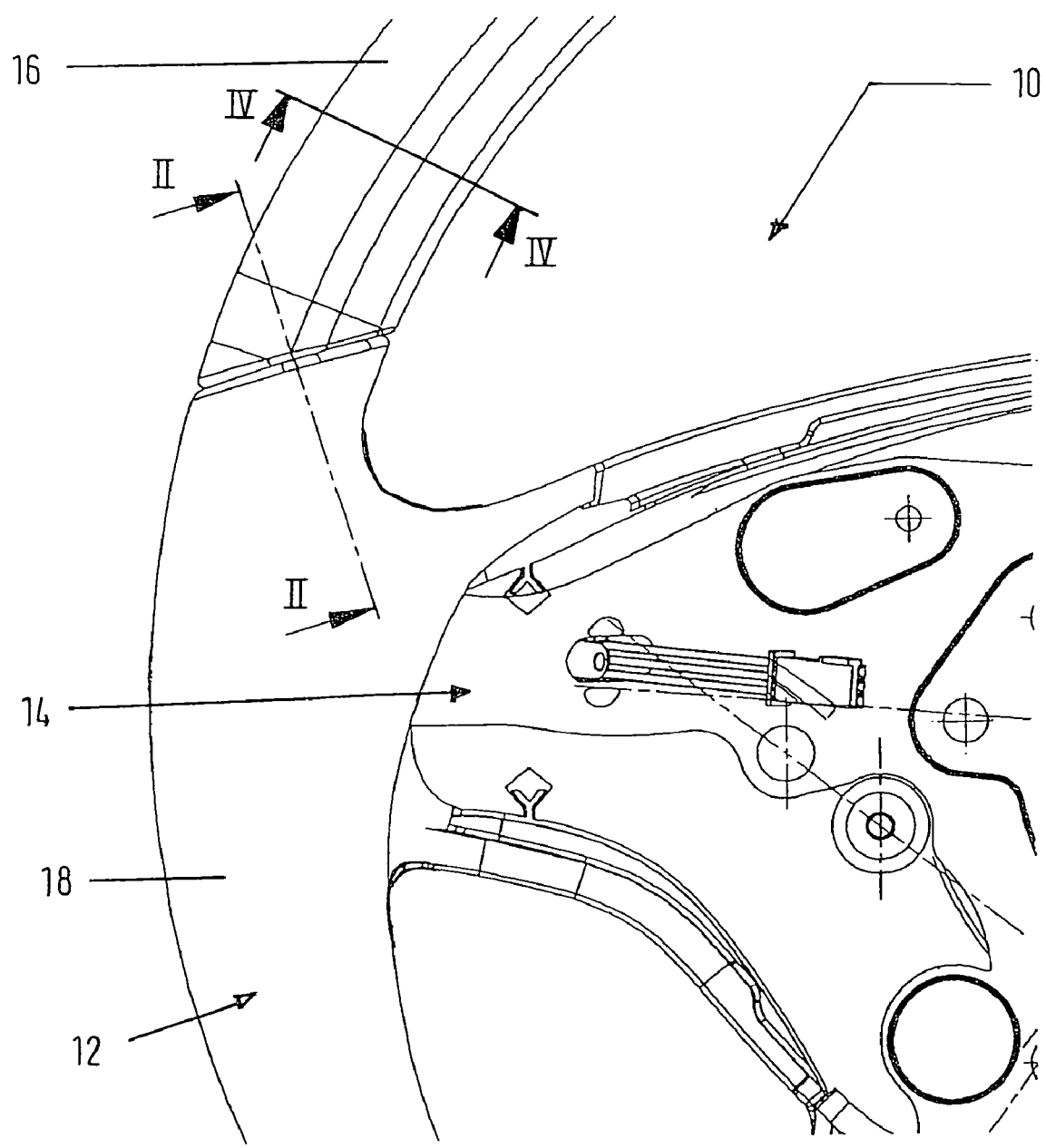
FIG. 1 shows a top view of a section of a heatable steering wheel according to the invention.

FIG. 1 shows a heatable steering wheel 10 in the transition area of a steering wheel rim 12 and a spoke 14. Somewhat above the spoke 14, a first, visible hard sheathing of the steering wheel rim 12, whose surface is refinished after having been installed, abuts a second, visible softer sheathing. In this case, the first sheathing is a wood appliqué or a wood sheathing 16, while the second sheathing is a leather sheathing 18.

Figure 2:
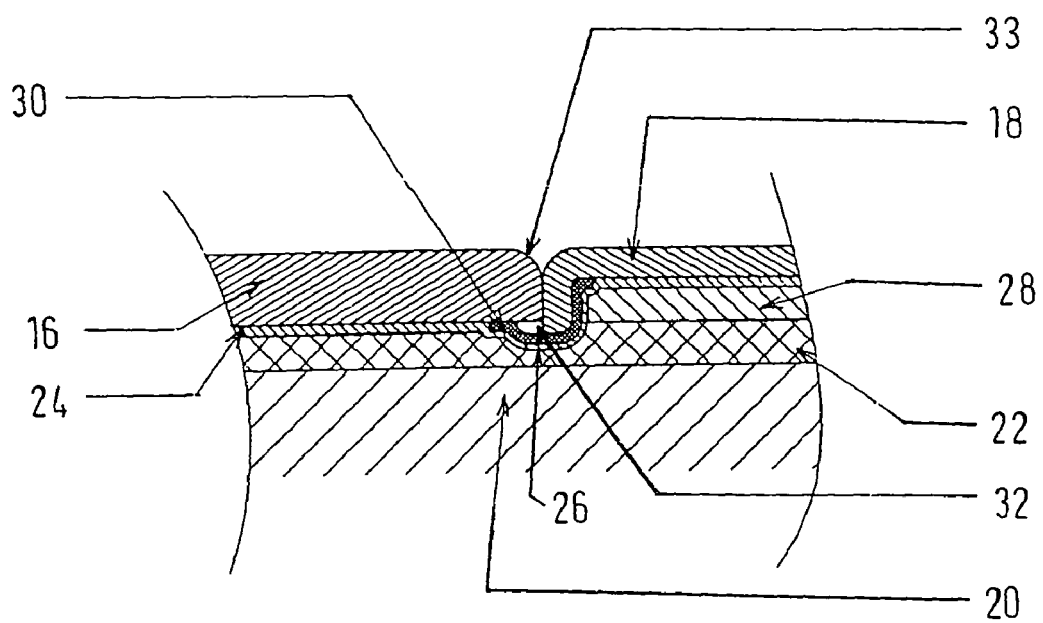
FIG. 2 shows a section view along the line II-II of FIG. 1 in a first embodiment.

FIG. 2 illustrates a first embodiment of the abutting area of the sheathings 16, 18. Inside the steering wheel rim 12, there is a steering wheel skeleton 20, which is surrounded by a foam covering 22. The steering wheel skeleton 20 and the foam covering 22 form a steering wheel blank. In the area of the wood sheathing 16, the steering wheel blank has a one-piece heating mat 24 wrapped around it. The foam covering 22 has an indentation 26 in the abutting area of the sheathings 16, 18. In this area as well, the heating mat 24 is wrapped around the steering wheel blank and lies directly against the foam covering 22. In the area of the leather sheathing 18, the heating mat 24 is wrapped around the steering wheel blank, although it is kept at a distance from the foam covering 22 by an equalization layer 28. In this case, the equalization layer 28 is a soft foam insert which, on the one hand, ensures a better grip feeling in the area of the leather sheathing 18 and, on the other hand, equalizes different thicknesses of the sheathings 16, 18. A coupling element 30 in the form of a separate annular part is adapted to the shape of the indentation 26 in the abutting area of the sheathings 16, 18. Between the indentation 26 and the annular part, there is the heating mat 24 that lies against the indentation 26 and against the bottom of the coupling element 30 as well as against the sheathings 16, 18.

The annular part can be seen in a cross sectional view in FIG. 2 and is configured as a clasp. It surrounds the steering wheel like a ring. The wood sheathing 16 or the leather sheathing 18 now follow as the outer layers of the steering wheel rim 12. These two sheathings 16, 18 abut each other in the area of a depression 32 of the coupling element 30 as seen from the outside. The coupling element 30 runs from the abutting edge of the wood sheathing 16 to the abutting edge of the leather sheathing 18. The wood sheathing 16 is applied before the leather sheathing 18. As a rule, an edge 33 of the wood sheathing 16 has to be refinished, that is to say, sanded. In the area of this edge 33, the heating mat 24 is protected by the annular part and cannot be damaged by the refinishing of the edge 33. The leather sheathing 18 is applied after the refinishing of the edge 33 and is beveled at the abutting edge of the leather, so that it extends into the depression 32. The beveled leather then lies against the abutting edge of the wood sheathing 16 and against the inside of the depression 32 of the coupling element 30. Since the coupling element 30 is configured as a clasp, the beveled leather is held in this position by being clamped. A different fastening technique, for example, by gluing, is likewise conceivable.

Figure 3:
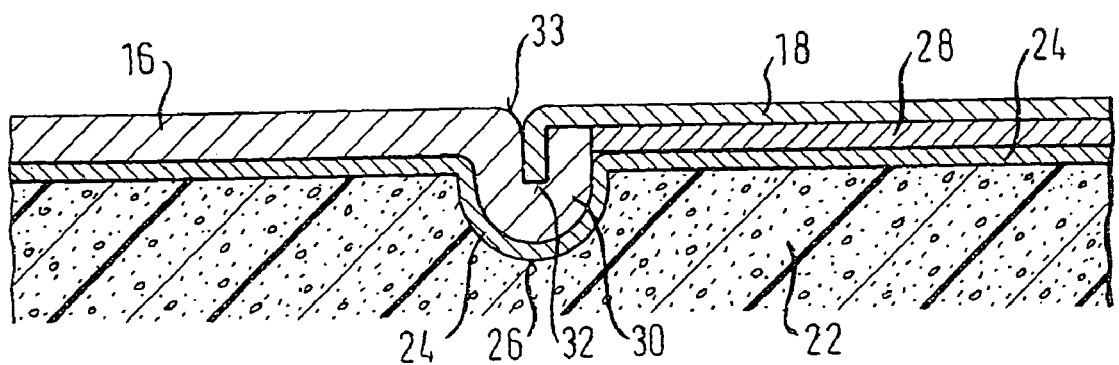
FIG. 3 shows a section view along the line II-II of FIG. 1 in a second embodiment.

FIG. 3 shows a second embodiment of the coupling element 30 of the steering wheel 10 according to the invention. The layered structure from the inside of the steering wheel 10 to its surface is similar to that of FIG. 2. In the section shown in FIG. 3, the steering wheel blank once again has the indentation 26 that serves to receive the coupling element 30 and is completely wrapped by the one-piece heating mat 24. The indentation has opposing side walls against which the heating mat 24 lies. In this embodiment, the coupling element 30 is configured in one piece with the first sheathing, that is to say, the wood sheathing 16. Hence, the abutting sheathings 16, 18 either make a direct transition to the coupling element 30 (wood sheathing 16) or else their bottom lies against said coupling element at the abutting edge (leather sheathing 18). Unlike in FIG. 2, the equalization layer 28 in FIG. 3 is arranged between the leather sheathing 18 and the heating mat 24. This measure translates into a better heat distribution in the area of the leather sheathing 18 and prevents the heating output of the one-piece heating mat 24, which is necessary for the thicker wood sheathing 16, from causing overheating of the surface of the steering wheel rim 12 in the area of the thinner leather sheathing 18. The equalization layer 28, which is located under the leather sheathing 18 in the section shown in FIG. 3, is adjacent to the coupling element 30. Similar to the first embodiment, the abutting edge of the leather sheathing 18 is beveled and extends into the depression 32 that is formed by the coupling element 30. The leather sheathing 18 is clamped, glued or otherwise fastened in this depression.

Figure 4:
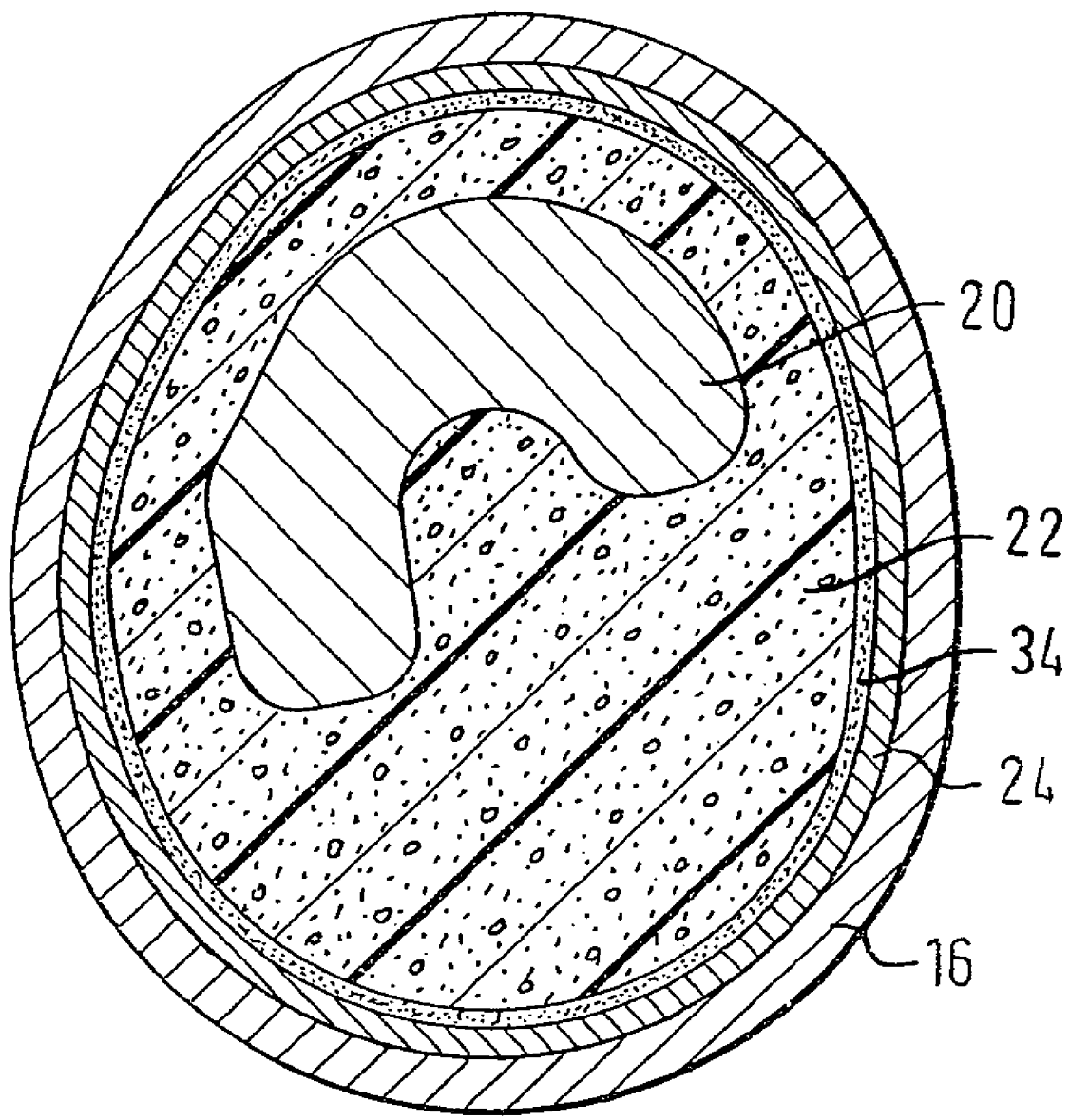
FIG. 4 shows a cross section of the steering wheel rim along the line IV-IV of FIG. 1.

FIG. 4 shows a cross section through the steering wheel rim 12 in the area of the wood sheathing 16. The layer structure of the steering wheel rim 12 is illustrated here once again. Inside the steering wheel rim 12, there is a steering wheel skeleton 20, surrounded by the foam covering 22 which, together with the steering wheel skeleton, forms the steering wheel blank. The heating mat 24 is fastened to the steering wheel blank by an adhesive 34. The heating mat 24 is, in turn, surrounded by a wooden shell that, at the same time, forms the surface of the steering wheel rim 12.

The invention claimed is:

1. A heatable steering wheel (10) comprising a steering wheel blank, a heating mat (24) wrapped around said steering wheel blank, a first visible sheathing whose surface is refinished after having been installed, a second visible sheathing being softer than said first sheathing, both of said sheathings abutting each other in an abutting area, and a coupling element (30) in said abutting area that, has a depression (32) being directed towards said steering wheel blank and that, starting from said first sheathing, extends under said abutting area all the way to an abutting edge of said second sheathing, said heating mat (24) extending continuously under said first sheathing and under said coupling element (30) all the way to under said second sheathing, said coupling element (30) being configured to protect said heating mat (24) in said abutting area against damage.

2. The heatable steering wheel (10) according to claim 1, wherein said heating mat (24) is in one piece.

3. The heatable steering wheel (10) according to claim 1, wherein said heating mat (24) lies against a bottom of said coupling element (30).

4. The heatable steering wheel (10) according to claim 1, wherein said abutting sheathings make one of a direct transition into said coupling element (30).

5. The heatable steering wheel (10) according to claim 1, wherein said abutting sheathings lie against said coupling element (30).

6. The heatable steering wheel (10) according to claim 1, wherein an equalization layer (28) arranged adjacent to said coupling element (30) is provided under said second sheathing.

7. The heatable steering wheel (10) according to claim 1, wherein said coupling element (30) is formed by a separate annular part.

8. The heatable steering wheel (10) according to claim 7, wherein said coupling element (30) is a clasp.

9. The heatable steering wheel (10) according to claim 1, wherein said coupling element (30) is formed in one piece with said first sheathing.

10. The heatable steering wheel (10) according to claim 1, wherein said first, visible sheathing is a wood applique.

11. The heatable steering wheel (10) according to claim 1, wherein said second, visible sheathing is a leather.

12. The heatable steering wheel (10) according to claim 11, wherein said abutting edge of said leather is beveled and extends into said depression (32).

13. The heatable steering wheel (10) according to claim 1, wherein said steering wheel blank consists of a steering wheel skeleton and a foam covering (22), said foam covering (22) having an indentation (26) that serves to receive said coupling element (30).

14. The heatable steering wheel (10) according to claim 13, wherein said indentation (26) has opposing side walls against which said heating mat (24) lies.

* * * * *